United States Patent [19]
Jung

[11] Patent Number: 6,108,196
[45] Date of Patent: Aug. 22, 2000

[54] LOCKING MECHANISM FOR NOTEBOOK COMPUTER

[75] Inventor: Hee-duck Jung, Suwon, Rep. of Korea

[73] Assignee: SamSung Electronics Co., Ltd., Suwon, Rep. of Korea

[21] Appl. No.: 09/090,217

[22] Filed: Jun. 4, 1998

[30] Foreign Application Priority Data

Jun. 4, 1997 [KR] Rep. of Korea ...................... 97-23123

[51] Int. Cl.[7] .............................. E05C 19/10; E05C 1/04; H05K 5/00
[52] U.S. Cl. ......................... 361/683; 361/683; 292/102; 292/106; 292/108; 292/128; 292/146; 292/150; 292/153; 292/175
[58] Field of Search ............................. 361/681; 292/128, 292/102, 106, 108, 175, 146, 150, 153

[56] References Cited

U.S. PATENT DOCUMENTS

| | | |
|---|---|---|
| 4,294,496 | 10/1981 | Murez . |
| 4,758,031 | 7/1988 | Wolf . |
| 4,838,585 | 6/1989 | Jondrow . |
| 4,901,261 | 2/1990 | Fuhs . |
| 5,011,198 | 4/1991 | Gruenberg et al. . |
| 5,168,429 | 12/1992 | Hosoi . |
| 5,198,966 | 3/1993 | Kobayashi et al. ...................... 361/695 |
| 5,255,154 | 10/1993 | Hosoi et al. ............................ 361/680 |
| 5,264,986 | 11/1993 | Ohgami et al. ......................... 361/740 |
| 5,490,036 | 2/1996 | Lin et al. . |
| 5,497,296 | 3/1996 | Satou et al. ............................. 361/681 |
| 5,576,929 | 11/1996 | Uchiyama et al. . |
| 5,580,107 | 12/1996 | Howell . |
| 5,660,065 | 8/1997 | Edlund . |
| 5,673,949 | 10/1997 | Mader et al. ............................ 292/164 |
| 5,740,012 | 4/1998 | Choi ........................................ 361/686 |

*Primary Examiner*—Leo P. Picard
*Assistant Examiner*—Tung Minh Bui
*Attorney, Agent, or Firm*—Robert E. Bushnell, Esq.

[57] ABSTRACT

A locking mechanism for a notebook computer has an ejecting unit which elastically pushes a latch up to a certain height. The ejecting unit includes an elastic member installed at a main base panel of the notebook computer and an ejector for pushing the latch up due to the elastic member when a display panel is to be opened. Thus, the notebook computer can be easily opened and closed and also the external appearance of the notebook computer looks more aesthetically pleasing.

20 Claims, 5 Drawing Sheets

FIG. 10 ial Property Office

LOCKING MECHANISM FOR NOTEBOOK COMPUTER

CLAIM FOR PRIORITY

This application makes reference to, incorporates the same herein, and claims all benefits accruing under 35 U.S.C. § 119 from an application for OPENING AND A CLOSING APPARATUS FOR A NOTEBOOK COMPUTER earlier filed in the Korean Industrial Property Office on Jun. 4, 1997, and there duly assigned Serial No. 23123/1997, a copy of which application is annexed hereto.

BACKGROUND OF THE INVENTION

1. Technical Field

The present invention relates to a locking mechanism for a notebook computer, and more particularly, to a locking mechanism for a notebook computer having an improved structure so that a display panel of the notebook computer can be easily opened and closed.

2. Related Art

Portable computers such as laptop computers and notebook computers have become increasingly popular for general use. The computers of this type have a base panel supporting a keyboard and necessary hardware such as a central processing unit (CPU), and a display panel pivotally mounted on the base panel for movement between a closed position when not in use and an open position when in use. The display panel generally supports a flat type of display such as a liquid crystal display (LCD) and is foldable onto the base panel containing the keyboard.

Portability of such computers requires that the display panel and the base panel be securely latched. A latch mechanism is generally provided to secure the display panel to the base panel. Exemplars of different latch mechanisms are disclosed in U.S. Pat. No. 4,294,496 for Portable Computer Enclosure issued to Murez, U.S. Pat. No. 4,758,031 for Retractable Safely Latch For Cases issued to Wolf, U.S. Pat. No. 4,838,585 for Handle Latch Mechanism issued to Jondrow, U.S. Pat. No. 4,901,261 for Retractable Hand And Latch for Portable Computers issued to Fuhs, U.S. Pat. No. 5,011,198 for Handle Latch Assembly issued to Gruenberg et al., U.S. Pat. No. 5,168,429 for Electronic Apparatus Having A Slidable Pawl For Removably Connecting A Display Housing To A Base Housing issued to Hosoi, U.S. Pat. No. 5,198,966 for Apparatus Including A Rotatable Latch Mechanism Having An Attaching Structure For Holding A Movable Member In A Closed Position issued to Kobayashi et al., U.S. Pat. No. 5,255,154 for Portable Electronic Apparatus With A Latch Mechanism Including An Interlock issued to Hosoi et al., U.S. Pat. No. 5,490,036 for Portable Computer With Tiltable Keyboard Structure Having Releasably Engageable Latch Assembly Members Extending Therefrom issued to Lin et al., U.S. Pat. No. 5,497,296 for Electronic Apparatus With Hinged Display And Latch Mechanism For Releasably Latching Display In Closed Position issued to Satou et al., U.S. Pat. No. 5,576,929 for Structure Having A Latch Mechanism Engaging An Intermediate Cover And An Outer Cover And Lifting The Intermediate Cover By Deformation Of Elastic Member issued to Uchiyama et al., U.S. Pat. No. 5,580,107 for Hidden Latch Hook For Portable Personal Computer And The Like issued to Howell, and U.S. Pat. No. 5,660,065 for Portable Computer Locking Device issued to Edlund.

A typical latch mechanism may be constructed by having a latch member operatively connected to a knob for permitting movement between a latch position when the display panel is folded down flat on the surface of the base panel and when the latch member latches onto a corresponding latch groove, and a release position when the latch member is released from the corresponding latch groove to open the display panel from the base panel. For example, in U.S. Pat. No. 5,497,296 issued to Satou and U.S. Pat. No. 5,576,929 issued to Uchiyama et al., a pair of latch members are installed at opposite side edges of the display panel and two slide knobs for operating the latch member are installed adjacent to the latch members. In order to open the display panel from the base panel, each of the two slide knobs must be slid in one direction to release the respective latch members from corresponding latch grooves. A retractable latch mechanism maybe used as recently disclosed in U.S. Pat. No. 5,580,107 issued to Howell, to secure the display panel to the base panel. A latch hook is retractable relative to the display panel when the display panel is moved between an open position and a closed position. In virtually all latch mechanisms for portable computers, the latch grooves, which are used for the latch members to latch onto, remain exposed to dust pollution. As such, I believe that an improved locking mechanism for portable computers can be contemplated with simpler design to prevent foreign materials from polluting the internal hardware of the base panel.

SUMMARY OF THE INVENTION

Accordingly, it is therefore an object of the present invention to provide an improved locking mechanism for use with a portable computer.

It is also an objective to provide a locking apparatus for a notebook computer having an improved structure so that a display panel can be easily opened or closed and entry of foreign materials such as dust through the latch hole can be effectively prevented.

These and other objects of the present invention can be achieved by a locking mechanism for use in a portable computer having a base panel supporting a keyboard and a display panel pivotally mounted on the base panel for movement between an open position when the portable computer is open, and a closed position when the portable computer is closed. The locking mechanism has at least one latch installed in the display panel for movement between a latch position and a release position, with a slide knob operatively connected thereto for permitting a user to move the latch between the latch position for engaging corresponding latch groove formed on the base panel to enable the display panel to be secured in the closed position, and the release position for disengaging from the corresponding latch groove of the base panel to enable the display panel to be moved into the open position; and at least one ejection unit installed in the base panel for elastically pushing the latch away from the base panel to cover the corresponding latch groove of the base panel when the latch is moved from the latch position to the release position, and for elastically pushing the latch to secure in the latch position after the latch is moved from the release position to the latch position.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
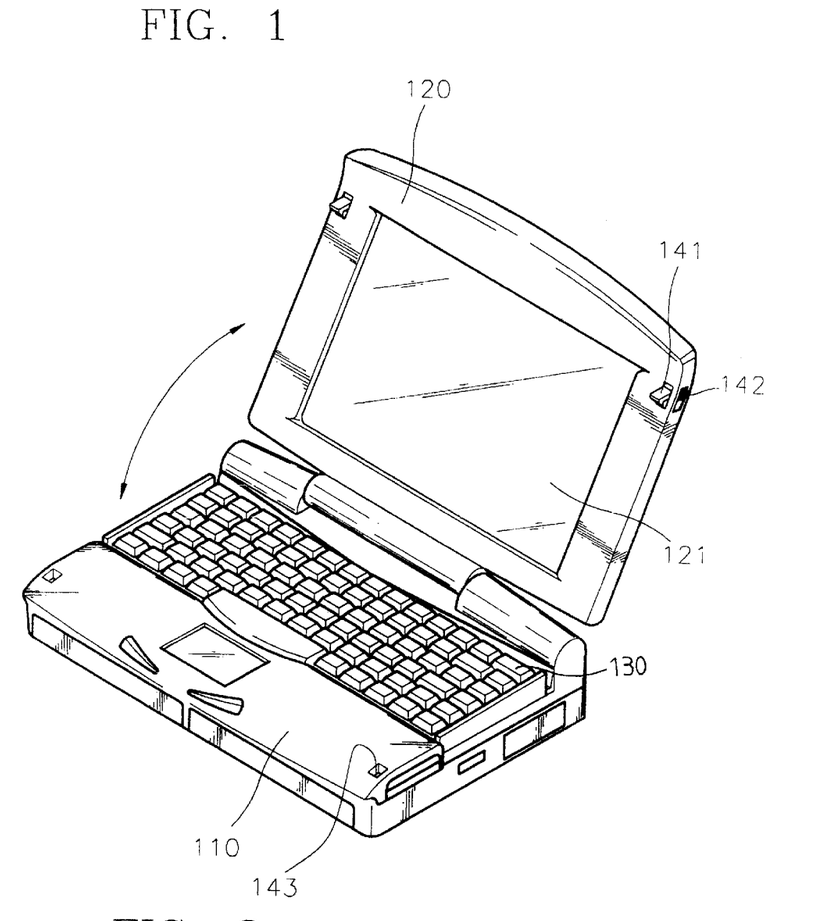
FIG. 1 is a perspective view of a portable computer equipped with a typical locking mechanism.
Figure 2:
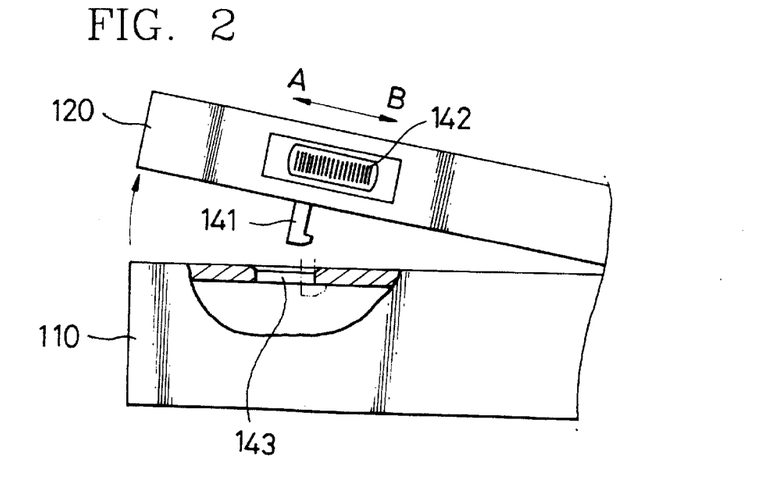
FIG. 2 is a side view illustrating operation of the typical locking mechanism of the portable computer.

Referring now to the drawings and particularly to FIGS. 1 and 2, which illustrate a portable computer such as a notebook computer equipped with a typical locking mechanism. The portable computer includes a main base panel 110 supporting a keyboard 130, and a display panel 120 supporting a liquid crystal display (LCD) 121 pivotally mounted on one side of the base panel 110 for movement between an open position and a closed position. On one side surface of the main base panel 110, a hard disk unit 111 containing a hard disk drive, a rechargeable battery latch 112 is installed for facilitating insertion and detachment of a rechargeable battery, and a PCMCIA card slot 113 is installed for attaching peripheral devices.

As a locking mechanism, two latches 141 are installed at opposite side edges of the display panel 120 and two latch slides 142 for operating the latches 141 are installed adjacent to the latches 141. In addition, two latch grooves 143 are installed at the corresponding positions to the latches 141 on the upper surface of the main base panel 110. To open the display panel 120 with respect to the main base panel 110, each of the two latch slides 142 must slide in a direction A to release the respective latches 141 from the latch grooves 143. A user must lift up the display panel 120 while maintaining a slide state of the latch slide 143 in the direction A to prevent the latch 141 from being hooked by the latch hole 143. In addition, since both latch slides 142 installed on both sides of the display panel 120 must be operated and both hands must be used simultaneously to open the portable computer, such requirement can be burdensome and extremely inconvenient. Further, since the latch groove 143 is exposed to the upper surface of the base panel 110, not only the appearance of the portable computer is compromised but foreign material such as dust may enter the main base panel 110 to pollute the internal hardware of the portable computer.

Figure 3:
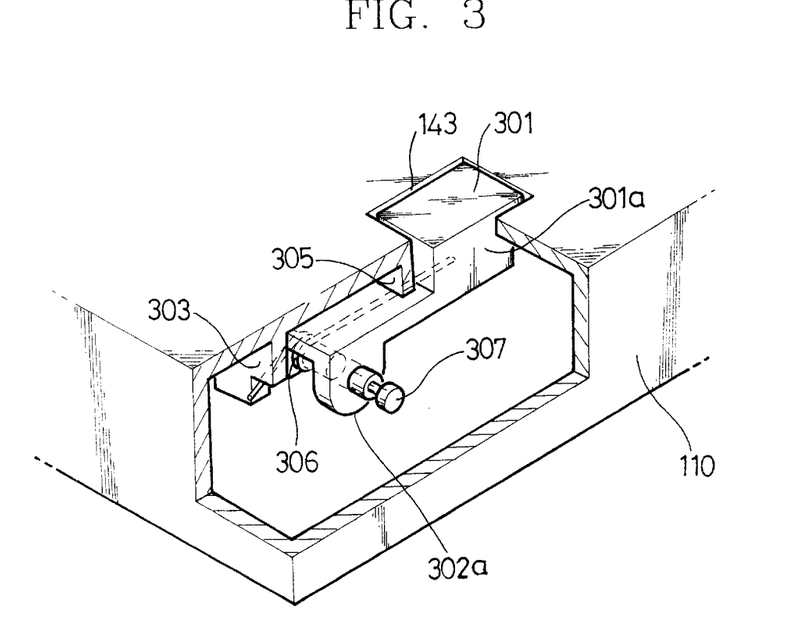
FIG. 3 is a perspective view of a locking mechanism for a portable computer constructed according to a first preferred embodiment of the present invention.
Figure 4:
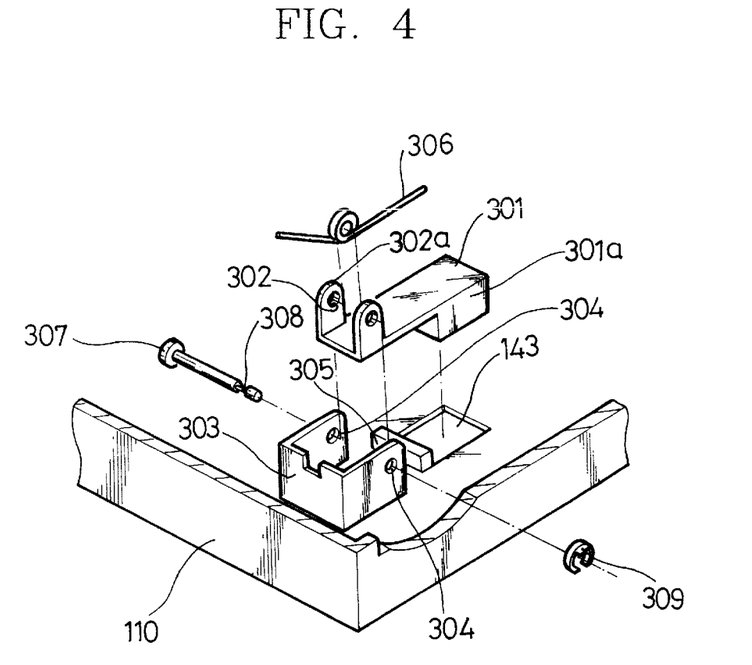
FIG. 4 is an exploded, perspective view of the locking mechanism as shown in FIG. 3.

Turning now to FIGS. 3 and 4 which illustrate an improved locking mechanism for use in a portable computer according to a first preferred embodiment of the present invention. The portable computer is shown in FIG. 1, including the usual base panel 110 supporting a keyboard 130, and the display panel 120 supporting a liquid crystal display (LCD) 121 pivotally mounted on one side of the base panel 110 for movement between an open position and a closed position.

The locking mechanism according to the present invention has two latches 141 installed at an upper portion of the front surface of the display panel 120 separated by a predetermined distance from each other, two latch grooves 143 formed at corresponding positions to the two latches 141 on the upper surface of the main base panel 110, and a slide knob 142 operatively connected to the two latches 141 for concurrently operating the two latches 141 installed on the upper side of the display panel 120.

In addition to the latches 141 and the slide knob 142, an ejection device as shown in FIG. 3 is provided at each corner of the base panel and is utilized to elastically push up the respective latch 141 for two reasons. First, the ejection device pushes the latch 141 to secure the latch 141 in place when the display panel 120 is closed and the latch 141 latches onto the corresponding latch groove 143 of the base panel 110. Second, the ejection device pushes the latch 141 away from the base panel 110 and covers the corresponding latch groove 143 to prevent foreign materials from polluting the internal hardware of the base panel 110.

The ejection device as shown in FIGS. 3 and 4, includes an ejector 301 for pushing up the latch 141, a torsion spring 306 which is an elastic member for applying an elastic force to the ejector 301, and a bracket 303 to which the ejector 301 is coupled by a hinge shaft 307. The bracket 303 is installed adjacent to the latch hole 143 and a shaft insertion hole 304 for inserting the hinge shaft 307 is respectively formed in the opposite walls of the bracket 303.

The ejector 301 is pivotally mounted on the bracket 303. A pair of support pins 302a each having a hole 302 for inserting the hinge shaft 307 is formed at one end portion of the ejector 301 to face each other and a head 301a is formed at the other end portion of the ejector 301. An E-ring groove 308 into which an E-ring 309 for preventing escape of the hinge shaft 307 from the bracket 303 is formed on one end portion of the hinge shaft 307. A torsion spring 306 for elastically biasing the head 301a of the ejector 301 toward the latch hole 143 is coupled to the hinge shaft 307. Thus, the ejector 301 coupled to the bracket 303 can elastically pivot with the head 301a of the ejector 301 is positioned in the latch hole 143. A stopper 305 is formed to be protruding from one side of the latch hole 143. The stopper 305 limits the height of the rising head 301a of the ejector 301 through the latch hole 143 to prevent the head 301a from rising above the latch hole 143.

The operation of the locking mechanism for a portable computer having the above structure according to the first preferred embodiment of the present invention will be described with reference to FIGS. 3–6 when the display panel 120 is closed and opened from the base panel 110, respectively.

Figure 5:
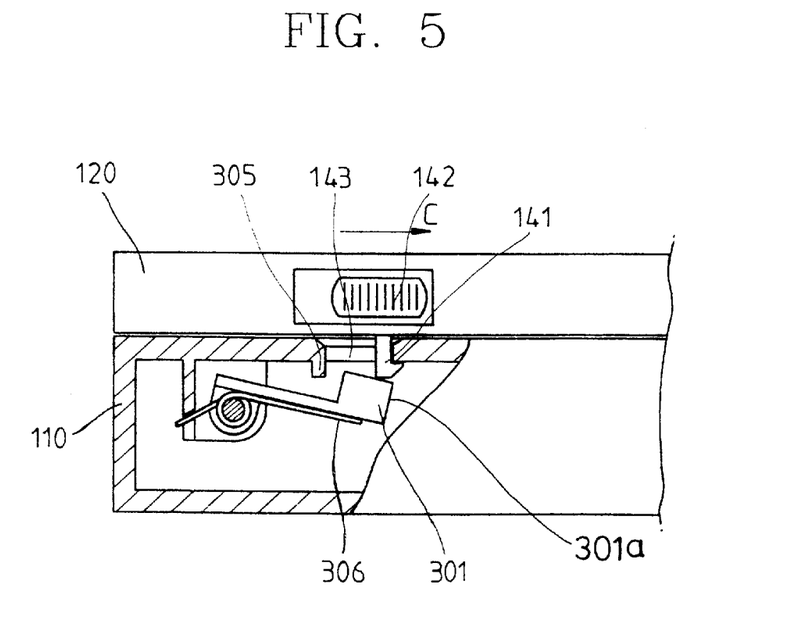
FIG. 5 is a side view of the locking mechanism of the portable computer when a display panel is closed according to the first preferred embodiment of the present invention.

Referring to FIG. 5, when the display panel 120 is closed, the latch 141 is inserted into and latched by the latch hole 143. Here, the latch slide knob 142 is slid in a direction C by a spring (not shown) installed in the display panel 120 so that the latch 141 maintains a latched state into the latch hole 143. In a state in which the latch 141 is inserted and latched into the latch hole 143, since the ejector 301 cannot push up the latch 141, the closed position can be secured.

Figure 6:
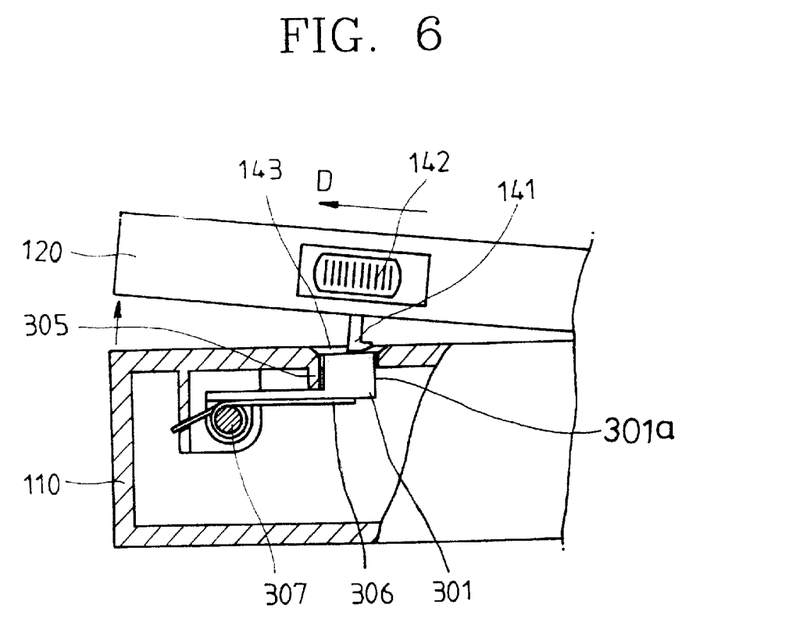
FIG. 6 is a side view of the locking mechanism of the portable computer when a display panel is open according to the first preferred embodiment of the present invention.

Referring to FIG. 6, the latch slide knob 142 is slid in a direction D to open the display panel 120. Then, the latch 141 is released from being latched into the latch hole 143, and accordingly, the ejector 301 pivots around the hinge shaft 307 and is lifted up by the torsion spring 306. The head 301a of the ejector 301 moving upward pushes the latch 141 so that the display panel 120 is opened from the base panel 110. In addition, when the ejector 301 is completely lifted up and inserts into the latch hole 143, foreign material such as dust is prevented from entering through the latch hole 143. Here, the rising height of the head 301a of the ejector 301 is appropriately limited by the protrusion 305.

As described, when the display panel 120 of the portable computer equipped with a locking mechanism constructed according to the first embodiment of the present invention is opened, the ejector 301 pushes the latch 141 up by an elastic force to facilitate opening of the display panel 120. Also, the ejector 301 inserting into the latch hole 143 prevents foreign material from entering inside the base panel 110, and since the latch hole 143 is closed by the ejector 301, the appearance of the notebook computer looks smooth and is more aesthetically pleasing.

Figure 7:
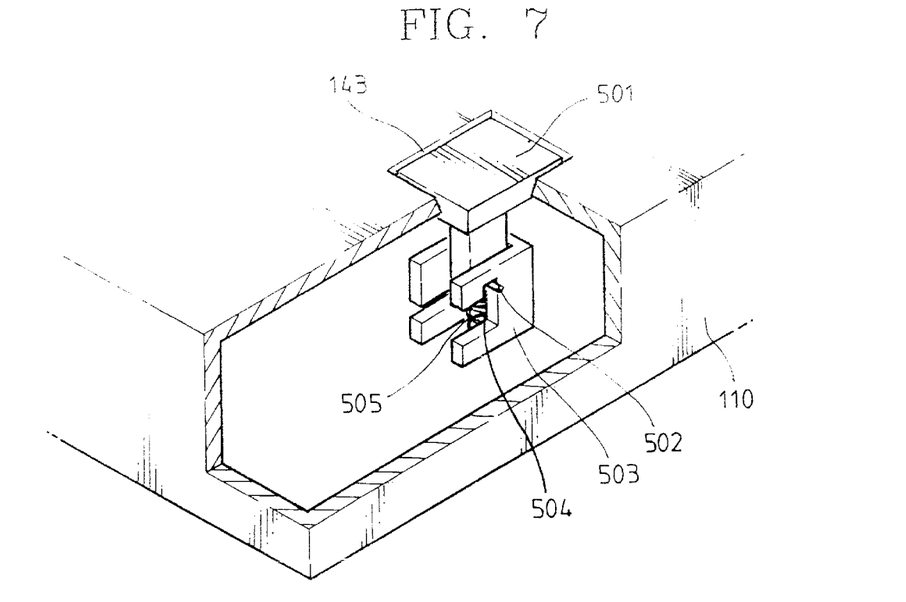
FIG. 7 is a perspective view illustrating a locking mechanism for a portable computer constructed according to a second preferred embodiment of the present invention.
Figure 8:
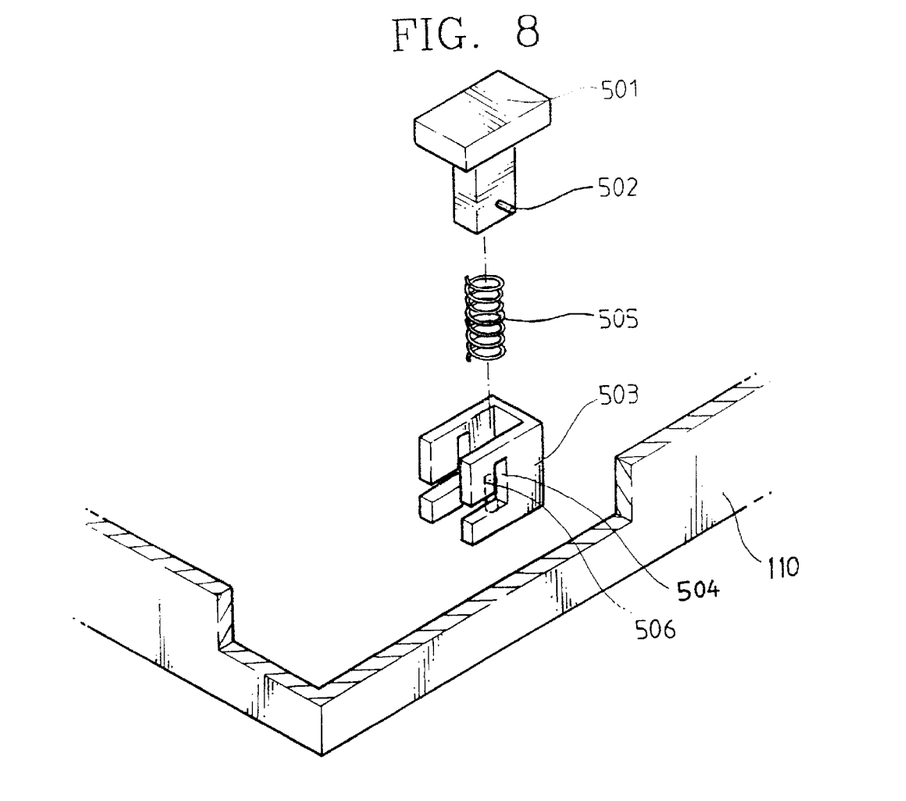
FIG. 8 is an exploded perspective view of the locking mechanism as shown in FIG. 7.

FIGS. 7 and 8 respectively illustrate a locking mechanism for use in a portable computer according to a second preferred embodiment of the present invention. The locking mechanism according to the second preferred embodiment of the present invention includes, like the first preferred embodiment, the latch (not shown, see 141 of FIG. 1) installed on the front surface of the display panel, a latch hole 143 formed at the position corresponding to the latch on the main base panel 110 of the notebook computer, and the latch slide (not shown, see 142 of FIG. 1) installed on the display panel 120 for operating the latch. Here, the characteristic feature of the second preferred embodiment is to also install an ejection device inside the main base panel 110 to elastically push the latch.

As shown in FIG. 7, the ejection means includes an ejector 501 for pushing the latch up, a compression spring 505 as an elastic member for applying an elastic force to the ejector 501, and a coupling member 503 for coupling the ejector 501 to the elastic member. Referring to FIGS. 7 and 8, the coupling member 503 is formed on the bottom surface inside the main base panel 110, directly under the latch hole 143. The coupling member 503 is a three-walled box structure open at one side and the upper side thereof such that the lower portion of the ejector 501 can insert into the hollow of the coupling member 503. Also, a guide groove 504 for guiding a guide bar 502 of the ejector 501, which will be described later, is formed longitudinally in the opposite walls of the coupling member 503.

The ejector 501 is coupled to the coupling member 503 to be capable of moving up and down. Also, the guide bar 502 is formed protruding from each surface of opposite sides of the ejector 501 and the guide bar 502 is inserted in the guide groove 504 of the coupling member 503. Thus, since the guide bar 502 is guided along the guide groove 504 in a longitudinal direction, the ejector 501 is lifted without shaking so that the ejector 501 can accurately insert into the latch hole 143.

The compression spring 505 is installed between the lower portion of the ejector 501 and the lower surface of the main base panel 110. That is, the compression spring 505 is located inside the coupling member 503 by fitting in a spring coupling protrusion 506 formed to protrude from the lower surface of the main base unit 110. The compression spring 505 applies an elastic force to push the ejector 501 which is coupled to the coupling member 503 to be capable of moving up and down toward the latch hole 143.

The operation of the locking mechanism for use in a portable computer according to the second preferred embodiment of the present invention will now be described with reference to FIGS. 7–10 when the display panel 120 is closed and open from the base panel 110, respectively.

Figure 9:
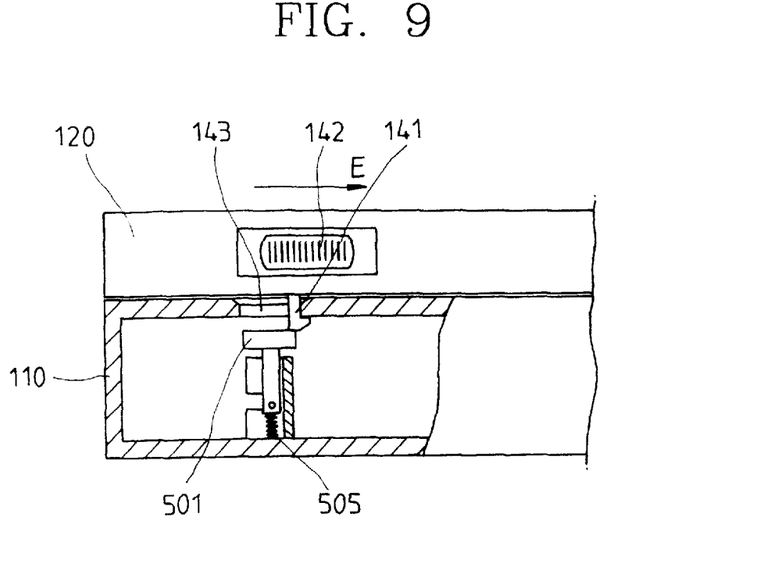
FIG. 9 is a side view of the locking mechanism of the portable computer when a display panel is closed according to the second preferred embodiment of the present invention.

Referring to FIG. 9, when the display panel 120 is closed to the main body unit, the latch 141 is hooked by the latch hole 143. Here, the latch slide 142 is pushed in a direction E by the spring (not shown) installed in the display panel 120 so that the latch 141 maintains a state of being hooked by the latch hole 143. Thus, as the latch 141 is hooked by the latch hole 143 overcoming an elastic force of the compression spring 505, the ejector 501 cannot push up the latch 141 so that the closed position is maintained.

Figure 10:
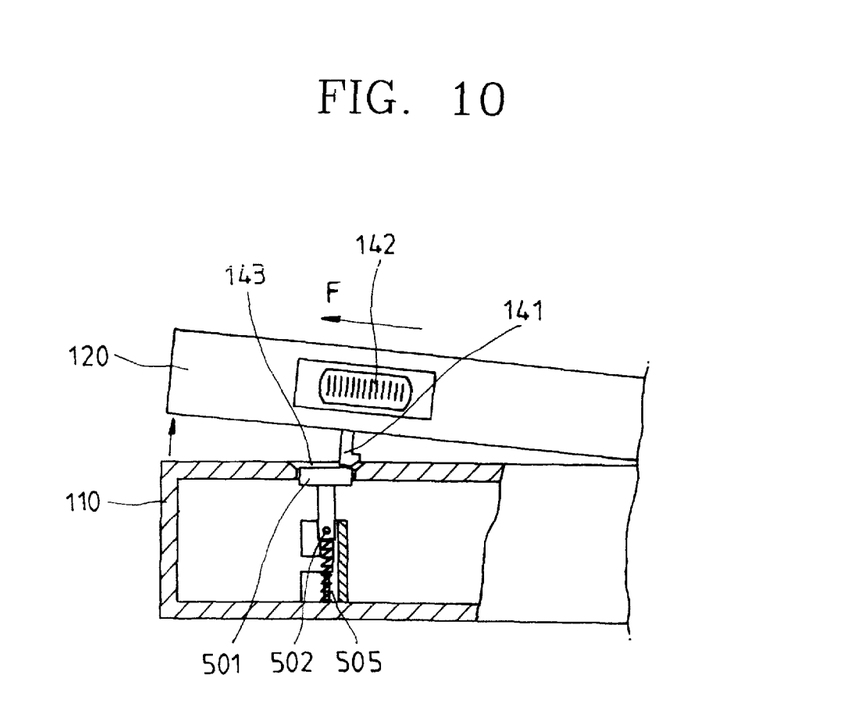
FIG. 10 is a side view of the locking mechanism of the portable computer when a display panel is open according to the second preferred embodiment of the present invention.

Referring to FIG. 10, the latch slide 142 is slid in a direction F in order to open the display panel 120. Then, the latch 141 is released from the latch hole 143, and accordingly, the ejector 501 rises due to the elastic force of the compression spring 505. As a result, the rising ejector 501 pushes up the latch 141 so that the display panel 120 can be opened a predetermined distance from the main base panel 110. Also, when rising of the ejector 501 is completed, the ejector 501 fits in the latch hole 143 to completely close the latch hole 143. Here, the height that the ejector 501 rises is appropriately limited by the guide groove 504 and the guide bar 502.

According to the second preferred embodiment of the present invention, when the display panel 120 is to be opened, the ejector 501 elastically pushes up the latch 141 so that the display panel 120 can be opened. Also, since the ejector 501 fits in the latch hole 143 and closes up the entire hole, the latch hole 143 is disguised by the ejector 501 so that the external appearance of the notebook computer looks better.

As described above, in the locking apparatus of a notebook computer according to the present invention, since the ejector for pushing up the latch by an elastic force to open the display panel is provided, opening/closing operations of the portable computer are facilitated. Also, since the latch hole formed on the upper surface of the main base panel is closed by the ejector, the external appearance of the notebook computer looks more aesthetically pleasing.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A locking mechanism of a portable computer, comprising:

the portable computer having a base panel supporting a keyboard and a display panel pivotally mounted on said base panel accommodating movement between the open position when the portable computer is open, and the closed position when said display panel is rotated to cover the keyboard;

a latch installed in said display panel of the portable computer accommodating movement between a latched position and a released position;

a slide knob operatively connected to said latch, permitting a user to move the latch between the latched position engaging a corresponding latch groove formed on said base panel to enable said display panel to be secured in the closed position, and the released position accommodating disengagement from the corresponding latch groove of said base panel to enable said display panel to be moved into the open position; and an ejection unit installed in said base panel elastically pushing said latch away from said base panel to cover the corresponding latch groove of said base panel but not protruding above said base panel when said latch is moved from the latched position to the released position, and elastically pushing said latch to secure said latch in the latched position after said latch is moved from the released position to the latched position, an upper surface of said ejector unit being in contact with a lower surface of said latch when the portable computer is closed.

2. The locking mechanism of claim 1, wherein said ejection unit further comprising:

a bracket provided on an interior surface of an upper portion of the base panel;

an ejector having one distal end pivotally mounted on said bracket and a head formed at the other distal end for movement up and down under the latch groove, the head being flat and substantially parallel with a top surface of said base panel when the portable computer is open, the head covering the latch groove and not protruding above said base panel when the portable computer is open; and an elastic unit applying an elastic force allowing the head of said ejector to push up said latch as said latch is moved between the latched position and the released position.

3. The locking mechanism of claim 1, wherein said ejection unit comprising:

a coupling member installed on an upper surface of the lower portion of said base panel;

an ejector installed at said coupling member accommodating only a rectilinear movement up and down; and an elastic unit applying an elastic force such that the upper portion of said ejector can push up said latch.

4. The locking mechanism of claim 3, wherein said elastic unit corresponding to a compression spring installed between the lower portion of said ejector and the upper surface of the lower portion of said base panel.

5. The locking mechanism of claim 3, further comprising a guide groove formed on each of opposite walls of said coupling member and a guide bar inserting into said guide groove to protrude from both side surfaces of said ejector.

6. The locking mechanism of claim 3, further comprised of the upper portion of said ejector being positioned to fit in and close said latch groove when the display panel is open, the upper portion being flat and substantially parallel with a top surface of said base panel, the upper portion covering the latch groove and not protruding above the top surface of said base panel when the portable computer is open, the upper portion of said ejector being in contact with the lower surface of said latch when the portable computer is closed.

7. The locking mechanism of claim 2, wherein said elastic unit corresponding to a torsion spring whose one end portion is supported by said bracket and the other end portion is installed at a bottom surface of said ejector away from the pivot mount and towards the other distal end having the head, said torsion spring applying a direct force below the head of said ejector, the head of said ejector not protruding above an exterior surface of said base panel.

8. The locking mechanism of claim 1, wherein said ejection unit further comprising:

an ejector having a middle portion having a flat rectangular shape, a pair of hinge mounts with each one of the hinge mounts having a first hole on opposite sides of a first distal end of the middle portion, the hinge mounts protruding in a direction perpendicular to a bottom section of the middle portion, a head formed at the second distal end of the middle portion and protruding away from a top section of the middle portion, the head of said ejector being positioned to fit in and close up said latch groove when said display panel is open;

an elastic unit applying a force upon the head of said ejector positioned between the pair of hinge mounts, said elastic unit having a second hole in a middle portion of said elastic unit;

a bracket having three walls having a pair of third holes on opposite walls accommodating said ejector and said elastic unit within the three walls, said third holes aligned with the first holes of the ejector and the second hole of the elastic unit; and a hinge shaft inserted through the third holes of said bracket, the first holes of the hinge mounts of said ejector, and the second hole of the elastic member, said ejector pivoting about said hinge shaft.

9. A computer system, comprising:

a base panel supporting a keyboard;

a display panel pivotally mounted on said base panel for movement between an opened position and a closed position; and a locking mechanism provided at said display panel for locking said display panel in the closed position when said display panel is moved to the closed position, and for releasing said display panel from the closed position when said display panel is moved to the open position, said locking mechanism comprising:

a latch installed in said display panel accommodating movement between a latched position engaging the corresponding latch groove formed on said base panel to enable said display panel to be secured in the closed position, and a released position disengaging from the corresponding latch groove of said base panel to enable said display panel to be moved into the open position; and an ejection unit installed in said base panel elastically pushing said latch away from said base panel to cover the corresponding latch groove of said base panel but not protruding to an outside area above an exterior surface of said base panel when said latch is moved from the latched position to the released position, and elastically pushing said latch to secure in the latched position after said latch is moved from the released position to the latched position, an upper portion of said ejector being in contact with a lower portion of said latch when said display panel is in the closed position.

10. The computer system of claim 9, wherein said ejection unit further comprising:

a bracket provided on an interior surface of an upper portion of said base panel;

an ejector having one distal end pivotally mounted on said bracket and a head formed at the other distal end projecting vertically from said ejector towards the latch groove accommodating movement up and down under said latch groove, the head covering said latch groove and not protruding above an exterior surface of said base panel; and an elastic unit applying an elastic force allowing the head of said ejector to push up said latch as said latch is moved between the latched position and the released position.

11. The computer system of claim 9, wherein said ejection unit further comprising:

a coupling member installed on an upper surface of the lower portion of said base panel, said coupling member having three walls;

an ejector installed at said coupling member for movement up and down, said ejector having a flat upper surface and being substantially parallel with the exterior surface of said base panel, a bottom surface of said ejector having a flat surface parallel with the upper surface of said ejector; and an elastic unit in contact with the lower surface of said ejector applying an elastic force such that the upper portion of said ejector can push up said latch.

12. The computer system of claim 10, wherein said elastic unit corresponding to a torsion spring whose one end portion is supported by said bracket and the other end portion is installed at a bottom surface of said ejector.

13. The computer system of claim 11, further comprised of:

said elastic unit corresponding to a compression spring installed between the lower portion of said ejector and the upper surface of the lower portion of said base panel, said compression spring in contact with both the bottom surface of said ejector and the upper surface of the lower portion of said base panel; and a protrusion on the upper surface of the lower portion of said base panel coupling said compression spring, said protrusion not being connected with said ejector.

14. The computer system of claim 12, further comprised of:

the head of said ejector being positioned to fit in and close up said latch groove when the display panel is open, the head being flat and substantially parallel with a top surface of said base panel when said computer is open; and a protrusion formed on a lower surface of the upper portion of said base panel stopping the head of said ejector from protruding above an exterior surface of said base panel.

15. The computer system of claim 13, further comprising:

a guide groove formed vertically on each of opposite walls of said coupling member, a guide bar inserting into said guide groove to protrude from both side surfaces of said ejector; and a second groove formed horizontally and perpendicular to said guide groove and connected with said guide groove.

16. The computer system of claim 15, wherein the upper portion of said ejector being positioned to fit in and close said latch groove when the display panel is open.

17. A method, comprising the steps of:

attaching a latch to a display panel of a portable computer, said latch protruding out of the display panel on a side accommodating a visual display of the display panel, said latch having a resilient member accommodating a sliding motion of said latch, the portable computer having the base panel supporting a keyboard and the display panel pivotally mounted on the base panel accommodating movement between the open position when the portable computer is open, and the closed position when the display panel is rotated to cover the keyboard; and installing an ejection unit in said base panel accommodating elastically pushing said latch away from the base panel to cover the corresponding latch groove of said base panel but not protruding to an outside area above an exterior surface of the base panel when said latch is moved from the latched position to the released position, and accommodating elastically pushing said latch to secure in the latched position after said latch is moved from the released position to the latched position.

18. The method of claim 17, wherein installing said ejection unit further comprises the steps of:

installing an ejector having a middle portion having a flat rectangular shape, a pair of hinge mounts with each one having a first hole on opposite sides of a first distal end of the middle portion, the hinge mounts protruding in a direction perpendicular to a bottom section of the middle portion, a head formed at the second distal end of the middle portion and protruding away from a top section of the middle portion, the head of said ejector being positioned to fit in and close said latch groove when the display panel is open;

inserting an elastic unit applying a force upon the head of said ejector positioned between the pair of hinge mounts, said elastic unit having a second hole in a middle portion;

attaching a bracket having three walls having a pair of third holes on opposite walls accommodating said ejector and said elastic unit within the three walls, said third holes aligned with the first holes of the ejector and the second hole of the elastic unit; and inserting a hinge shaft inserted through the third holes of said bracket, the first holes of the hinge mounts of said ejector, and the second hole of the elastic member, said ejector pivoting about said hinge shaft.

19. The method of claim 17, wherein installing said ejection unit further comprising the steps of:

installing a coupling member on an upper surface of the lower portion of said base panel, said coupling member having three walls;

installing an ejector at said coupling member accommodating only a rectilinear movement up and down, said ejector having a flat upper surface and being substantially parallel with a top surface of said base panel, a bottom surface of said ejector having a flat surface parallel with the upper surface of said ejector; and inserting an elastic unit in contact with the bottom surface of said ejector applying an elastic force such that the upper surface of said ejector can push up said latch.

20. The method of claim 19, wherein:

said elastic unit corresponding to a compression spring installed between the bottom surface of said ejector and the upper surface of the lower portion of said base panel, said compression spring being installed between the three walls of said coupling member; and the upper surface of said ejector being positioned to fit in and closing said latch groove when the display panel is open, and the upper surface of said ejector being in contact with a lower portion of said latch when the display panel is closed.

* * * * *